United States Patent
Mikkelsen (10) Patent No.: US 9,898,004 B2
(45) Date of Patent: Feb. 20, 2018

(54) METHOD AND SYSTEM FOR OPERATING A VEHICLE WHEN AN OCCUPANT EXPERIENCES A POTENTIAL MEDICAL CONDITION

(71) Applicant: GM GLOBAL TECHNOLOGY OPERATIONS LLC, Detroit, MI (US)

(72) Inventor: Karl Mikkelsen, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 14/887,806

(22) Filed: Oct. 20, 2015

(65) Prior Publication Data

US 2017/0108862 A1    Apr. 20, 2017

(51) Int. Cl.
*G05D 1/00* (2006.01)
*B60W 30/09* (2012.01)
*B60W 40/08* (2012.01)
*B60K 28/06* (2006.01)

(52) U.S. Cl.
CPC .......... *G05D 1/0061* (2013.01); *B60K 28/06* (2013.01); *B60K 28/066* (2013.01); *B60W 30/09* (2013.01); *B60W 40/08* (2013.01); *G05D 1/0016* (2013.01); *B60W 2040/0818* (2013.01); *B60W 2540/22* (2013.01); *B60W 2540/26* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 5,691,693 A | * | 11/1997 | Kithil | 340/439 |
| 6,014,595 A | * | 1/2000 | Kobayashi | 701/1 |
| 8,169,311 B1 | * | 5/2012 | Breed | 340/438 |
| 8,860,564 B2 | * | 10/2014 | Rubin et al. | 340/436 |
| 2008/0046149 A1 | * | 2/2008 | Breed | 701/45 |
| 2008/0157510 A1 | * | 7/2008 | Breed et al. | 280/735 |
| 2008/0161989 A1 | * | 7/2008 | Breed | 701/29 |

(Continued)

OTHER PUBLICATIONS

U.S. Appl. No. 14/521,623, filed Oct. 23, 2014, Method and System for Mitigating the Effects of an Impaired Driver, Applicant—GM Global Technology Operations LLC, Inventor—Chad T. Zagorski, 31 pages.

*Primary Examiner* — Shelley Chen
(74) *Attorney, Agent, or Firm* — Reising Ethington, P.C.

(57) ABSTRACT

There is provided a method and system for operating a vehicle when a vehicle occupant experiences a potential medical condition. The system may include an external object control module (EOCM) configured to wirelessly receive diagnostic signals from an occupant-coupled device, such as a smart watch or implanted cardiac pacemaker. The method and system process the diagnostic signals, for example by determining the nature and/or severity of the potential medical condition and carrying out one or more responses in reaction thereto. The type of response carried out can depend on whether the occupant is a driver or passenger, as well as the nature and/or severity of the potential medical condition, and can range from giving medical instructions to vehicle occupants to automatically slowing the vehicle down and bringing it to a safe stop in the event that the driver is unable to do so.

23 Claims, 2 Drawing Sheets

(56) References Cited

U.S. PATENT DOCUMENTS

| | | | |
|---|---|---|---|
| 2008/0216567 A1* | 9/2008 | Breed | 73/146.5 |
| 2009/0046538 A1* | 2/2009 | Breed et al. | 367/93 |
| 2010/0268423 A1* | 10/2010 | Breed | 701/45 |
| 2012/0089299 A1* | 4/2012 | Breed | 701/36 |
| 2012/0212353 A1* | 8/2012 | Fung et al. | 340/905 |
| 2013/0179024 A1* | 7/2013 | Nordbruch | 701/23 |
| 2014/0371984 A1* | 12/2014 | Fung et al. | 701/38 |

* cited by examiner

Figure 1

METHOD AND SYSTEM FOR OPERATING A VEHICLE WHEN AN OCCUPANT EXPERIENCES A POTENTIAL MEDICAL CONDITION

FIELD

The present invention relates generally to a method and system for a vehicle that evaluates a potential medical condition of an occupant and carries out one or more remedial actions in response thereto.

BACKGROUND

Vehicles are increasingly being communicatively linked to various types of mobile devices, including wearable devices like smart watches that can provide medical information about a user. Furthermore, some implanted and external biomedical devices are now developed with short-range wireless communication abilities so that they too can wirelessly provide medical information about a user. Therefore, it may be desirable for a vehicle module to be connected to a user coupled device—whether it be a wearable device, an implanted or external biomedical device, or some other type of user coupled device—so that the vehicle module can take one or more remedial actions in the event that a vehicle occupant experiences a potential medical condition.

SUMMARY

According to one embodiment, there is provided a method of operating a vehicle when a vehicle occupant experiences a potential medical condition, comprising the steps of: receiving a diagnostic signal from an occupant-coupled device, the diagnostic signal is a wireless signal that includes information regarding the potential medical condition of the vehicle occupant to whom the occupant-coupled device is attached; analyzing the diagnostic signal to evaluate the potential medical condition of the vehicle occupant; and carrying out a response with a vehicle system to address the potential medical condition of the vehicle occupant. The response includes one or more remedial action(s) based on the potential medical condition.

According to another embodiment, there is provided a system for operating a vehicle when a vehicle occupant experiences a potential medical condition, comprising: an external object control module (EOCM) configured to receive a diagnostic signal from an occupant-coupled device, the diagnostic signal is a wireless signal that includes information regarding the potential medical condition of the vehicle occupant to whom the occupant-coupled device is attached; a vehicle driving system coupled to the external object control module (EOCM) and configured to carry out a driving-based response that includes autonomous or semi-autonomous driving actions that control at least one of the steering, the propulsion, or the braking of the vehicle; and a vehicle communication system coupled to the external object control module (EOCM) and configured to carry out a communication-based response that includes communicative actions that provide information regarding the potential medical condition. The system is configured to evaluate the potential medical condition of the vehicle occupant by analyzing the diagnostic signal from the occupant-coupled device, and to carry out a response with at least one of the vehicle driving system or the vehicle communication system in response thereto.

DRAWINGS

Preferred exemplary embodiments will hereinafter be described in conjunction with the appended drawings, wherein like designations denote like elements, and wherein.

DESCRIPTION

The method and system described herein may be used to operate a vehicle when a vehicle occupant experiences a potential medical condition. In one potential embodiment, the system includes an external object control module configured to wirelessly receive diagnostic signals from an occupant-coupled device, such as a smart watch or implanted cardiac pacemaker. The method and system are preferably designed to process the diagnostic signals, for example by determining the nature and/or severity of the potential medical condition, and to carry out one or more remedial actions in response thereto. The type of remedial action carried out can depend on whether the occupant is the driver or a passenger, as well as the nature and/or severity of the potential medical condition. For example, the method and system may send command signals to a vehicle communication system causing it to provide medical instructions to vehicle occupants or warnings to nearby pedestrians or to call emergency contacts, or command signals could be sent to a driving system to automatically slow down the vehicle or even bring it to a stop in the event that the driver is unable to do so.

Figure 1:
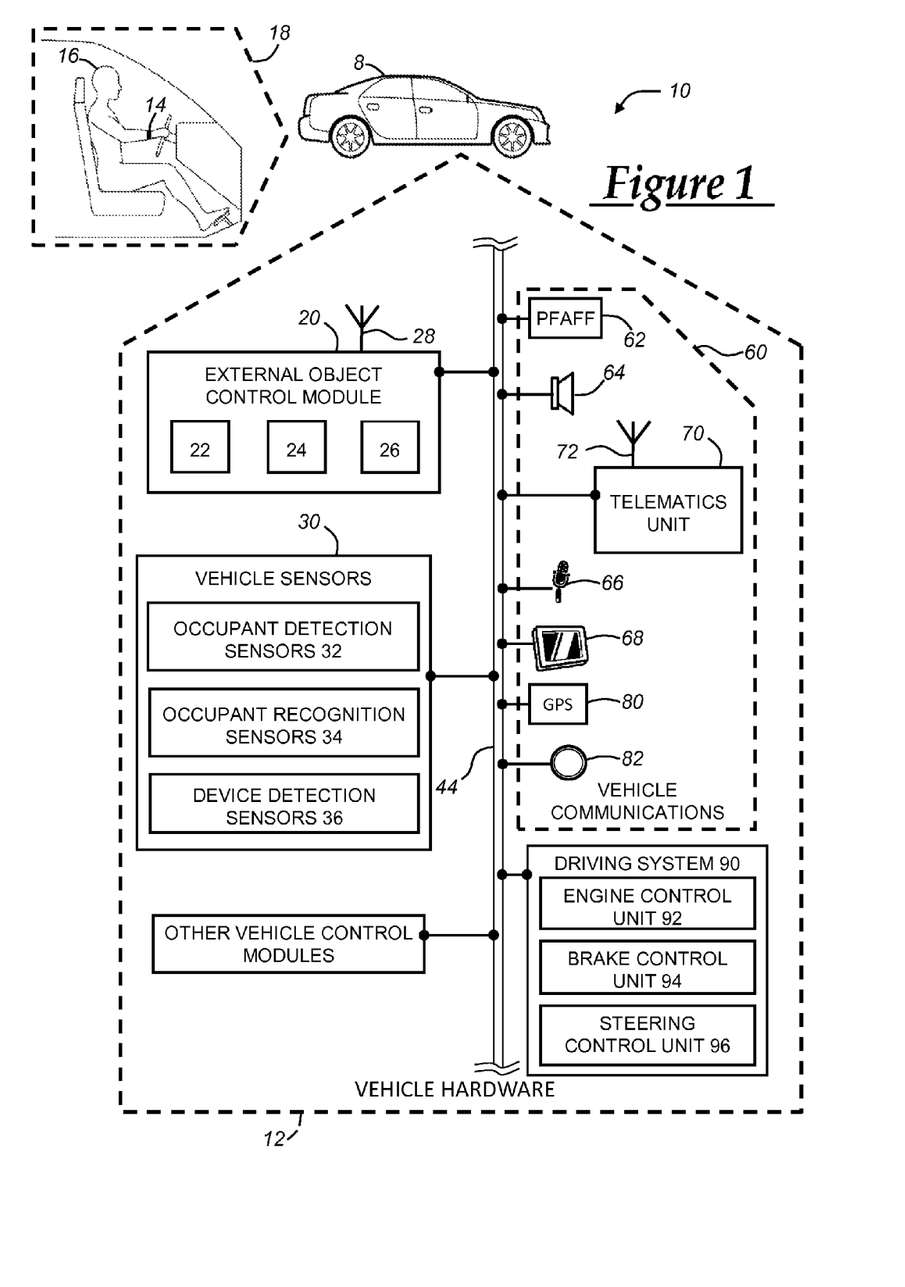
FIG. 1 is a block diagram depicting an embodiment of a system for operating a vehicle when a vehicle occupant experiences a potential medical condition.

Referring now to the drawings, FIG. 1 depicts a potential embodiment of a system 10 for operating a vehicle when a vehicle occupant experiences a potential medical condition. System 10 may be installed on any type of vehicle 8, which is schematically shown as having an interior cabin 18 and vehicle hardware 12. It should be appreciated that the present method can be used with any number of different systems and is not specifically limited to the operating environment shown here.

Vehicle 8 is depicted as a passenger car, but it should be appreciated that the present method and system may be implemented with other vehicles including motorcycles, trucks, sports utility vehicles (SUVs), recreational vehicles (RVs), marine vessels, aircrafts, trains, etc. FIG. 1 depicts a vehicle occupant 16 as the driver of the vehicle 8, but the term "vehicle occupant" may also refer to a passenger of the vehicle as well. Some components of vehicle hardware 28 that are more relevant to the present method are shown in FIG. 1, although skilled artisans will appreciate that a much more extensive collection of vehicle hardware exists in most modern vehicles. The vehicle hardware 28 may include an external object control module (EOCM) 20, various vehicle sensors 30, a vehicle communication system 60, and a vehicle driving system 90. These and other components of the vehicle hardware 28 may communicate with one another via a communication bus 44 or via a secure wireless network (not shown). It should also be appreciated that the vehicle hardware 28 shown in FIG. 1 is only for purposes of illustration, as the actual arrangement or configuration of components, devices, modules and/or systems could vary substantially from that shown here and it is not limited to any particular embodiment. For instance, the EOCM 20, the vehicle sensors 30, the vehicle communications system 60 and/or the vehicle driving system 90 may be stand-alone items (as shown) or they may be combined or integrated with other components, devices, modules and/or systems in the vehicle. Put differently, the particular architecture of system 10 is not critical, as the system could be provided according to myriad configurations and arrangements.

The term "occupant-coupled device," as used herein, broadly includes any device that is worn by, implanted within, or otherwise physically coupled to a vehicle occupant and that is capable of providing the system with information pertaining to the occupant. As depicted in FIG. 1, occupant-coupled device 14 may be a wearable computing device that is worn by occupant 16, such as a smart watch that is fit around the wrist. In other embodiments, occupant-coupled device 14 can be a biomedical device that is implanted within occupant 16 (e.g., an implantable cardioverter defibrillator, an implantable cardiac pacemaker, etc.) or a biomedical device that is simply in physical contact with the user, but is not surgically or otherwise implanted. The occupant-coupled device 14 preferably includes circuitry and/or other components for wirelessly communicating with the system 10 and, more particularly, with the EOCM 20. In order for the occupant-coupled device 14 to provide the system 10 with useful information, the device will likely need to have sensing elements and/or other input means capable of detecting biological conditions, physical conditions, homeostatic conditions, medical conditions and/or other conditions of, or relating to, the occupant 16. Two non-limiting examples of user-coupled devices 14 are a smart-watch with a heart-rate sensor incorporated therein and an implantable cardiac pacemaker with an electrical activity sensor, wherein both of these devices would need to have some type of wireless communication capability in order to transmit diagnostic signals that convey medical information about the user to the system 10. More details regarding such wireless communication capabilities and signals are provided in the following paragraphs.

External object control module (EOCM) 20 is a vehicle module that is capable of wirelessly communicating with one or more electronic components or devices external to the vehicle hardware 12, such as the occupant-coupled device 14. EOCM 20 is shown having a short-range wireless transceiver 22, a processing device 24, a memory device 26, and an antenna 28. However, EOCM 20 may include any variety of electronic processing devices, memory devices, input/output (I/O) devices, and/or other known components, and may perform various processing, control and/or communication related functions. According to one embodiment, the EOCM 20 is designed to wirelessly communicate with one or more occupant-coupled devices 14 using any number of suitable wireless protocols including, but not limited to, WiMAX, ZigBee, Wi-Fi direct, Bluetooth, NFC, or some other IEEE 802 or other wireless protocol. It is worth noting that the EOCM 20 can be integrated or combined with other components, devices, modules and/or systems in the vehicle, such as a body control module, an infotainment module and/or a telematics unit, to cite several examples.

Short-range wireless transceiver 22 is preferably coupled to antenna 28 and includes circuitry for receiving and/or transmitting short-range wireless signals, such as radio frequency (RF) signals. Processing device 24 is coupled to transceiver 22 and may include a microprocessor, a microcontroller, an application specific integrated circuit (ASIC), or any other processing device that can execute electronic instructions. Memory device 26 is coupled to transceiver 22 and/or processing device 24 and may include any suitable combination of electronic memory components needed for storing information like external device and/or vehicle settings, stored user profiles, electronic instructions used to carry out the present method, etc. Some non-limiting examples of the types of functions that processing device 24 can carry out include: processing signals received from one or more occupant-coupled devices 14 through the antenna 28 and the transceiver 22, preparing signals for transmission to one or more external devices through the transceiver and antenna, interacting with the memory device 26 via read/write instructions in order to retrieve or store information and data, and providing command signals to other components, devices, modules and/or systems in the vehicle that cause them to carry out certain functions. According to one example, some or all of the electronic instructions that are used to implement the present method are stored on the memory device 26 and are executed by the processing device 24.

Vehicle sensors 30 include any number of sensors located throughout the vehicle that may be utilized by the method and system described herein, including but not limited to, occupant detection sensors 32, occupant recognition sensors 34, device detection sensors 36, and others. Each of these categories of sensors may be used by the present method to help detect or identify a vehicle occupant 16 so that if there is a potential medical condition, the method can carry out one or more customized remedial actions tailored to that particular occupant. It should be appreciated that the vehicle sensors 30 may be combined with or be a part of other components, devices, modules and/or systems in the vehicle (e.g., occupant detection sensors 32 could be part of a vehicle safety system, and device detection sensors 36 could be part of EOCM 20 or a body control module) and do not need to be standalone components like those illustrated in FIG. 1. Vehicle sensors 30 are preferably coupled to the rest of system 10 via communications bus 44 or some other means, and provide the system with sensed information and/or determinations relating to occupancy or identification that are made based on the sensed information.

Occupant detection sensors 32 include any type of sensing device that can detect the presence or absence of a vehicle occupant 16. Some non-limiting examples of occupant detection sensors 32 include seat occupancy sensors having pressure sensors incorporated in the seats (e.g., those used with vehicle airbag and other safety systems), cameras or other sensors mounted within the vehicle cabin 18 that are trained on the expected locations of occupants, as well as any other sensing device that can detect a driver or passenger. As their name suggests, occupant recognition sensors 34 may include any type of sensing device that can recognize or identify a vehicle occupant 16, including biometric sensors installed on door handles or elsewhere on the vehicle, cameras or other sensors (e.g., the same cameras used with the occupant detection sensors 32), or any other sensing device that can be used to discern the identity of a particular driver or passenger. According to one example, the occupant recognition sensors 34 include a camera equipped with corresponding facial recognition software that can determine if a vehicle occupant is a known user, such as by comparing images of the occupant to those saved in a user profile. Device detection sensors 36 may include any type of sensing device that can detect the presence or determine the identity of a nearby electronic device and thereby infer the presence and/or identity of an associated user. For instance, device detection sensors 36 could include components used to detect the presence of an authenticated keyfob, a previously paired or synced mobile communications device (e.g., a smart phone), or an occupant-coupled device 14, to cite several possibilities. In each of these examples, the device detection sensors 36 may first detect the presence of a device and then, based on the nature of the device, make an educated guess as to the identity of a vehicle occupant and determine if the occupant is a driver or passenger. Many other types of vehicle sensors 30 are possible.

Vehicle communication system 60 may include any type of device that can be used to communicate with people or devices inside or outside of the vehicle. According to the embodiment illustrated in FIG. 1, the vehicle communications system 60 includes a pedestrian friendly alert function (PFAF) 62 for audibly and/or visibly communicating with nearby pedestrians, a speaker 64 and microphone 66 for audibly communicating with vehicle occupants, a visual display 68 for visibly communicating with vehicle occupants, and a telematics unit 70 and global positioning system (GPS) unit 80 for wirelessly communicating with medical facilities, emergency contacts, call centers, satellites, cell towers and/or any other device or system located apart from the vehicle. The vehicle communications system 60 may also include any number of controls, buttons, switches, indicators, etc., which are shown in FIG. 1 as item 82. Communication system 60 may be coupled to EOCM 20, vehicle sensors 30, as well as the rest of system 10 via bus 44. According to one example, the communication system 60 is configured to receive command signals from EOCM 20 and to correspondingly carry out one or more remedial actions that involve providing instructions to vehicle occupants or nearby pedestrians, providing driving directions to a nearby medical facility, or calling emergency contacts or a call center. Skilled artisans will appreciate that telematics unit 70 can establish cellular and/or other wireless communications via a variety of known methods. As with the previously described hardware, vehicle communication system is not limited to the particular configuration and arrangement shown in FIG. 1, as that drawing is simply meant to schematically illustrate one possibility.

Vehicle driving system 90 may include any type of device that can autonomously or semi-autonomously control some aspect of vehicle propulsion, braking and/or steering. The driving system schematically shown in FIG. 1 includes an engine control unit 92, a brake control unit 94, and a steering control unit 96, however, it is envisioned that these different control units or modules may not be housed or contained in a single system 90. Engine control unit 92 may be part of an engine control module (ECM) and is preferably designed to govern one or more aspects of vehicle propulsion by controlling an internal combustion engine, an electric motor, or a combination thereof. Brake control unit 94 may be included within a brake control module (BCM) or anti-lock braking system (ABS) module and preferably controls one or more braking mechanisms, such as frictional brakes, regenerative brakes or a combination thereof. Steering control unit 96 could be part of a steering control module of some sort and is designed to control one or more aspects of vehicle steering or navigation. According to one embodiment, control units 92, 94 and/or 96 are part of one or more autonomous or semi-autonomous driving systems, like those used to implement features such as adaptive cruise control, collision avoidance and mitigation, automatic lane centering or changing, as well as other self driving features. The present method and system may use autonomous or semi-autonomous driving features of vehicle driving system 90 to automatically perform one or more remedial actions in the event that the driver is experiencing a potential medical condition and is unable to do so on his or her own. To carry this out, the vehicle driving system 90 may be configured to receive command signals from EOCM 20 and to perform one or more remedial actions in response thereto that involve automatically controlling the propulsion, braking and/or steering of the vehicle. In another embodiment, vehicle driving system 90 may make its own determinations as to automatic control of propulsion, braking and/or steering, instead of receiving such instructions from the EOCM 20. Any number of different arrangements and configurations are possible.

It should be appreciated that the modules, sensors and systems described herein are not limited to their schematic illustrations in FIG. 1 and/or their descriptions with respect to specific embodiments. These items may be provided in any number of different ways and it should be appreciated that FIG. 1 represents only one such embodiment.

Figure 2:
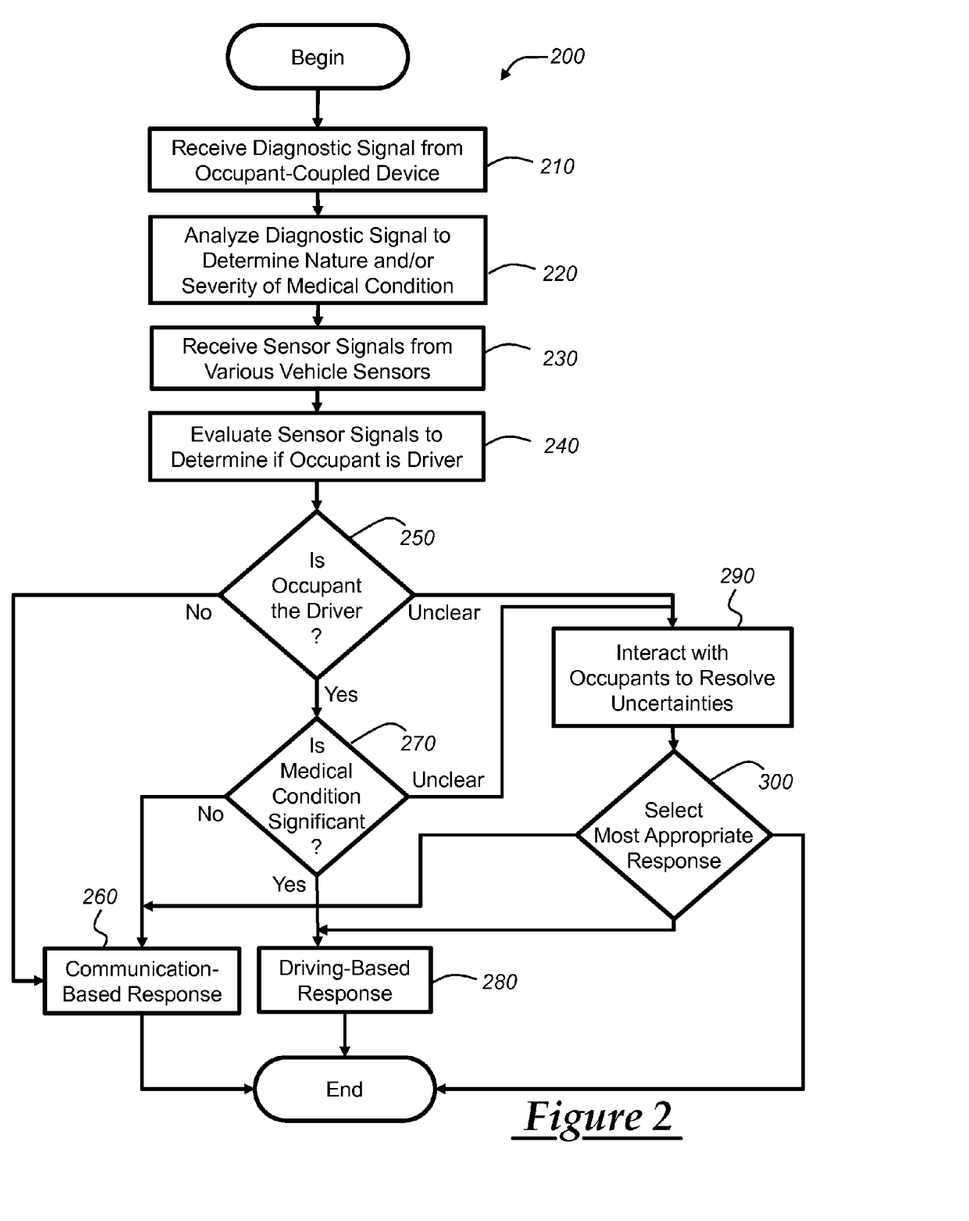
FIG. 2 is a flowchart illustrating an embodiment of a method of operating a vehicle when a vehicle occupant experiences a potential medical condition, and the method may be used with the system of FIG. 1.

Turning now to FIG. 2, there is shown an exemplary embodiment of a method 200 for operating a vehicle when a vehicle occupant experiences a potential medical condition, such as a cardiac arrest.

Beginning with step 210, the method receives a diagnostic signal from an occupant-coupled device 14. The diagnostic signal is a wireless signal that includes information regarding a potential medical condition of the vehicle occupant 16 to whom the occupant-coupled device 14 is attached. In order to provide diagnostic signals, the occupant-coupled device 14 must first gather or otherwise obtain information from the occupant 16, such as information relating to biological, physical, and/or medical conditions of the occupant. In one embodiment where the occupant-coupled device 14 is a wearable device like a smart-watch, the device 14 measures one or more heart related parameters of the occupant (e.g., heart rate, heart rhythm, blood pressure, etc.), it performs some processing or analysis of the heart related parameters, and then it sends one or more diagnostic signals to the external object control module (EOCM) 20 over a short-range wireless link (e.g., a Bluetooth connection) if the heart related parameters indicate that the occupant is experiencing a potential medical condition, such as a cardiac arrest or failure. In this and in other examples, the EOCM 20 may receive the diagnostic signal via antenna 28 and transceiver 22 and, depending on the particular wireless protocol, may transmit a confirmatory signal indicating its receipt back to the occupant-coupled device 14.

Of course, heart related parameters are not the only parameters that may be measured or monitored, as the occupant-coupled device 14 may also include sensors to determine: a blood-sugar level, a protein level, an enzyme level, a body temperature, or brain activity, to cite several examples. The system 10 may be configured such that the occupant-coupled device 14 analyzes or processes the measured parameters before it sends the corresponding results of such analysis to the module 20; it could be configured such that the occupant-coupled device 14 does little to no analysis and simply sends the module 20 the measured parameters (i.e., the raw data readings), at which point the module performs the majority of the analysis or processing; or it could be configured somewhere in between such that analyzing and processing of the measured parameters are carried out by both the device 14 and the module 20. In a different embodiment, step 210 receives one or more wireless diagnostic signals from an occupant-coupled device that is an implantable biomedical device, such as a cardioverter defibrillator or cardiac pacemaker surgically implanted within the occupant. Other arrangements are certainly possible.

At step 220, the method analyzes the diagnostic signal to evaluate or otherwise determine the nature and/or the severity of the potential medical condition of the vehicle occupant. As explained above, much of the analysis may be performed at the occupant-coupled device 14, leaving the analysis to be carried out in step 220 as merely decoding/reading the contents of the diagnostic signal. Alternatively, the nature of the potential medical condition may be determined by the occupant-coupled device 14 while the severity of the condition may be determined by the module 20, or vice versa. It is also possible for the module 20 to determine both the severity and the nature of the potential medical condition based on the diagnostic signal provided by the occupant-coupled device 14. Any suitable division of analyzing or processing tasks between the occupant-coupled device 14, the external object control module (EOCM) 20, as well as other pieces of the vehicle hardware 12 may be employed.

According to one potential embodiment of step 220, the external object control module (EOCM) 20 evaluates the contents of the diagnostic signals from the occupant-coupled device 14 in conjunction with one or more medical profiles or pieces of data saved in memory 26 or elsewhere. For example, the EOCM 20 may first identify the particular occupant-coupled device 14 that sent the diagnostic signals, such as by using some type of mobile identification number or other unique identifier for device 14, and may then retrieve a corresponding medical profile or other electronic file containing medical information. The medical profile could include medical data or history for that particular user (e.g., age, gender, history of cardiovascular disease, low-blood pressure, previously recorded heart related parameters, etc.), or it could include standard thresholds meant to apply to many users (e.g., upper or lower thresholds for heart rate, heart rhythm, blood pressure, etc.). In either event, step 220 may compare the current readings or parameters, as provided in the diagnostic signal, to the stored medical information in order to more accurately evaluate the nature and/or severity of the potential medical condition. This may be performed by comparing a heart rate reading, or a change therein, to one or more heart rate thresholds and identifying situations where the heart rate reading is outside of the thresholds (either above or below) as a potential cardiac arrest or failure. Those skilled in the art will appreciate that there are many ways to analyze the diagnostic signals gathered in the previous step and that the present method is not limited to any particular method. For example, the particular thresholds used could be customized or tailored to the individual user to whom the occupant-coupled device 14 is attached.

It is possible at some point during the present method (e.g., after the diagnostic signal has been received and/or evaluated) for the system 10 to send one or more signals back to the occupant-coupled device 14. Such a signal may simply be for handshaking-type purposes, or it could include more substantive information indicating the nature and/or severity of the potential medical condition or the identity of the occupant to whom the device 14 is coupled (e.g., is the occupant the driver or a passenger). In any event, the method may communicate the results of the analysis done in step 220 or some other step from the system 10 back to the occupant-coupled device 14, and further communications may facilitate desired coordination between the (e.g., such as a signal conveying that the vehicle has, in fact, come to a complete stop).

At step 230, the method receives one or more sensor signals from various vehicle sensors 30. These sensor signals may be subsequently used to determine if there is an occupant, if the occupant is a driver or passenger, or they may help corroborate conclusions regarding the nature and severity of the potential medical condition, to cite several examples. According to one possible implementation of step 230, some combination of sensor signals are received from the occupant detections sensors 32, the occupant recognition sensors 34 and/or the device detection sensors 36 at the external object control module (EOCM) 20 over the vehicle communications bus 44. As with the processing of the diagnostic signal, the various vehicle sensors 30 could be configured in such a way that much of the signal processing occurs at the sensor or sensing element itself, in which case the vehicle sensors may simply provide the EOCM 20 with the processed output or findings of such sensors. In a different embodiment, the vehicle sensors 30 may simply gather, package and transmit the measured parameters or raw sensor readings to the EOCM 20 in order for that module to conduct most of the signal processing or analysis. Many suitable arrangements are possible, as the present method is not limited to any particular one.

At step 240, the method evaluates the sensor signals and determines whether the vehicle occupant is a driver or passenger, and may use a number of different techniques to do so. This determination, along with the nature and/or severity of the potential medical condition, can have a bearing on the particular response and remedial actions that are carried out by the present method and system. More aggressive or assertive remedial actions may be needed if a driver is suffering from a severe medical condition like cardiac arrest and is no longer able to control the vehicle, versus the same condition befalling a passenger. It is worth remembering that when step 210 receives a diagnostic signal from an occupant-coupled device 14, it will not be readily apparent to whom the device is coupled (a driver, passenger, etc.), as the system will simply know that a diagnostic signal is being received that pertains to one of the occupants of the vehicle. Therefore, the method may employ any known combination of techniques to determine, or at least provide probative information relevant to the determination of, whether occupant 16 is a driver or a passenger. For instance, step 230 may receive sensor signals from various occupant detection sensors 32 (e.g., pressure sensors in the different seats) indicating how many people are currently in the vehicle; if the driver's seat sensor is the only sensor 32 indicating the presence of an occupant, then step 240 may conclude that the incoming diagnostic signal must be sent by an occupant-coupled device 14 attached to the driver.

According to a different embodiment, step 240 may use sensor signals from one or more occupant recognition sensors 34 to determine if the occupant-coupled device 14 that is transmitting the diagnostic signals is coupled to the driver of the vehicle or not. For example, the occupant recognition sensors 34 may include a camera aimed at the driver seat and corresponding facial recognition capabilities so that the method can detect the presence of a driver and identify the driver with saved facial profiles or the like. Once the identity of the driver is known and the identity of the occupant to whom device 14 is coupled is known (this could be discerned from the unique identifier or other information in the diagnostic signal), step 240 can simply compare these identities or otherwise evaluate this information to determine if the person wearing the occupant-coupled device 14 is in fact the driver.

In yet another embodiment of step 240, the method receives sensor signals from one or more device detection sensors 36, which can include any number of sensors in the vehicle that detect the presence of and/or authenticate devices such as key fobs or smart phones. To illustrate, the method may receive a wireless signal from a vehicle keyfob that is used to both unlock and start the vehicle (e.g., in the case of keyless or push button ignitions); it is assumed that the system 10 has the capability to recognize the driver associated with that keyfob by retrieving one or more user profiles from some type of electronic memory, such as memory device 26. Since the identities of both the user of the keyfob (who is the presumed driver) and the occupant to whom device 14 is coupled are known, step 240 may be able to correlate these pieces of information and determine if the device 14 is coupled to the driver. As mentioned before, the external object control module (EOCM) 20 may include or even be a body control module.

In each of the preceding embodiments of step 240, the present method is attempting to determine if the vehicle occupant to whom the occupant-coupled device 14 is attached is the driver of the vehicle. Knowing this information may help the method and system formulate or otherwise put together an appropriate set of remedial actions designed to minimize or even eliminate the risk for road related safety issues attributable to medical conditions afflicting the driver. Other techniques, steps, methods, etc. may be used in lieu of or in addition to those illustrated above and, in some cases, different combinations of the preceding examples are used together to corroborate and confirm the determinations of step 240. At this point the method has preferably gathered information regarding the nature and/or severity of the potential medical condition, as well as the identity of the occupant to whom the condition pertains, and the method may continue with its selection of a proper response.

At step 250, if it was previously determined that the occupant-coupled device 14 is not attached to the driver of the vehicle (i.e., the device is attached to a passenger), then the method may proceed to step 260 so that a communication-based response can be developed and carried out. The communication-based response of step 260 may entail one or more remedial actions that are generally communicative in nature, as these types of actions are probably more appropriate for situations where a passenger is experiencing a potential medical condition, whether it be severe or mild. To illustrate this point, consider the example where a passenger wearing an occupant-coupled device 14 is experiencing a cardiac arrest which has been detected by system 10, the communication-based response developed in step 260 may include one or more of the following remedial actions that can be carried out with communications system 60: providing navigation directions to a nearby medical facility; providing the occupants with medical instructions for treating the potential medical condition (e.g., instructions for performing CPR); automatically calling a medical facility, an emergency call center and/or pre-saved emergency contacts that are part of a user profile, or some combination thereof In a different embodiment, step 260 asks the occupants of the vehicle questions regarding the potential medical condition using a human-machine interface (HMI) or the like and, based on answers to those questions, develops a specific or customized set of communicative remedial actions to carry out. All of the aforementioned remedial actions are communicative in nature—that is, they involve communicating with occupants inside of the vehicle or with people or devices located outside of the vehicle in order to address the medical condition at hand—and they can be carried out via command signals sent from the external object control module (EOCM) 20 to the communications system 60, which is a vehicle system.

Referring back to step 250, if it was previously determined that the occupant-coupled device 14 is attached to the driver, then the method may proceed to step 270 at which point the method considers the significance of the potential medical condition. The "significance" of the medical condition, as that term is used herein, can pertain to the nature, the severity or both the nature and the severity of the medical condition. Because the medical condition appears to be occurring in the driver, it is preferable for step 270 to audibly and/or visibly interact with the driver in order to confirm the condition before determining the significance of the medical condition and, hence, the appropriate next steps to take. For example a human-machine interface (HMI) implemented using speaker 64, microphone 66, visual display 68, and/or button 82 can be used to ask the driver if the medical condition is significant, if he or she needs assistance driving the vehicle, navigating the vehicle to a medical facility, or whether the driver has control of the vehicle and/or the present circumstances. The audible prompt may include questions pertaining to whether occupant 16 is a driver or a passenger of the vehicle, as well as the nature and/or severity of the potential medical condition. If step 270 concludes that the medical condition is not significant, then step 270 may direct the method to carry out a communication based response in step 260 or simply end the method. If, on the other hand, step 270 determines that the driver is experiencing a significant medical condition, then the method may advance to step 280.

At step 280, a driving-based response is developed and carried out in order to address the situation where the driver is experiencing a significant medical condition and may need assistance controlling the vehicle. There are many potential driving-based responses that can be developed, depending on the particular circumstances, but it is envisioned that most driving-based responses will involve some use of driving systems 90 to autonomously or semi-autonomously control the propulsion and/or direction of the vehicle. For example, command signals may be sent to the engine control unit 92 and/or the brake control unit 94 that cause the vehicle to slow down or even come to a stop, assuming that it is safe to stop the vehicle at that location. In a different embodiment, driving system 90 may, through its engine control unit 92, brake control unit 94, and steering control unit 96, attempt, 31 pagesa safe manner. Driving system 90 may be in communication with other vehicle modules that aid the driving system in performing this function. For example, various vehicle sensors and cameras may provide information pertaining to the vehicle's surroundings (e.g., through radar or cameras positioned to sense objects surrounding the vehicle). Any of the non-limiting examples of potential driving-based responses disclosed in U.S. application Ser. No. 14/521,623, filed Oct. 23, 2014, may be utilized by the present method, as the entire contents of that application are hereby incorporated by reference.

In addition to controlling the propulsion and/or direction of the vehicle, it is envisioned that the driving-based response in step 280 will also include one or more communicative actions. For instance, vehicle communication system 60 may use speaker 64 to inform occupants about the driving actions being carried out and/or to provide them with instructions so that they do not hinder or impede the autonomous or semi-autonomous driving actions. In addition, a pedestrian friendly alert function (PFAF) 62 may inform nearby pedestrians of the circumstances, warn them to stay clear of the vehicle, and/or inform them to call for assistance. Step 280 may also send command signals to activate the vehicle's emergency flashers so that nearby motorists are put on alert. Telematics unit 70 may establish communications with an emergency response service, such as an ambulance, via cellular communications. The system 10 may also provide medical information regarding the occupant 16, so that the emergency technicians will already be apprised of the situation when they arrive on the scene. Step 280 may perform any of the communications-based responses from step 260 in addition to the driving-based responses, but the converse is not true as driving-based responses should generally not be performed in step 260.

If it is unclear from step 250 whether the occupant-coupled device 14 is coupled to the driver or, if the significance of the potential medical condition is unclear from step 270, then the method may advance to step 290 so that the system 10 can gather information from the occupants in an effort to resolve any ambiguity. For example, the speaker 64, microphone 66, visual display 68 or a combination thereof may communicate with one or more occupants and ask them if the driver is experiencing a medical condition and needs help. It is also possible to gather information regarding the nature and/or severity of the potential medical condition, such as asking if an occupant is experiencing a cardiac arrest or failure. Alternatively, the system 10 may indicate to the vehicle occupants that there was a problem with a specific step of the method.

Once the requisite information has been gathered, step 300 directs the method towards the communication-based response of step 260, the driving-based response of step 280, or simply terminates the method if neither of the preceding responses are warranted. If no response or an unintelligible response is given at step 300, the method may assume that the driver or other occupant is incapacitated and, thus, direct the method to the driving-based response of step 280.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a vehicle when a vehicle occupant experiences a potential medical condition, comprising the steps of:
   receiving a diagnostic signal from an occupant-coupled device, the diagnostic signal is a wireless signal that includes information regarding the potential medical condition of the vehicle occupant to whom the occupant-coupled device is attached;
   analyzing the diagnostic signal to evaluate the potential medical condition of the vehicle occupant, analysis of the diagnostic signal includes obtaining a unique identifier for the occupant-coupled device, using the unique identifier to retrieve a saved medical profile or to identify the vehicle occupant to whom the occupant-coupled device is attached, and evaluating at least one of a nature or a severity of the potential medical condition according to criteria that are tailored to the saved medical profile or the identity of the vehicle occupant to whom the occupant-coupled device is attached, wherein the saved medical profile includes medical data or history pertaining to the vehicle occupant to whom the occupant-coupled device is attached; and
   carrying out a response with a vehicle system to address the potential medical condition of the vehicle occupant, wherein the response includes one or more remedial action(s) based on the evaluation of the at least one of the nature or the severity of the potential medical condition.

2. The method of claim 1, wherein the receiving step further comprises receiving the diagnostic signal from the occupant-coupled device that is a wearable computing device worn by the vehicle occupant.

3. The method of claim 1, wherein the receiving step further comprises receiving the diagnostic signal from the occupant-coupled device that is an implantable biomedical device surgically implanted within the vehicle occupant.

4. The method of claim 1, wherein the receiving step further comprises receiving the diagnostic signal from the occupant-coupled device that includes information pertaining to at least one heart related parameter selected from the group consisting of: a heart rate, a heart rhythm, or a blood pressure.

5. The method of claim 1, wherein the receiving step further comprises receiving the diagnostic signal from the occupant-coupled device at an external object control module (EOCM) mounted within the vehicle, the occupant-coupled device and the external object control module (EOCM) are in communication with one another via a short-range wireless connection.

6. The method of claim 1, wherein the analyzing step further comprises retrieving the saved medical profile from a memory device, and analyzing the diagnostic signal in conjunction with the saved medical profile to evaluate at least one of the nature or the severity of the potential medical condition.

7. The method of claim 6, wherein the analyzing step further comprises obtaining a heart rate reading from the received diagnostic signal, obtaining a heart rate threshold from the retrieved medical profile, comparing the heart rate reading to the heart rate threshold, and determining that the occupant to whom the occupant-coupled device is attached is experiencing a cardiac arrest or failure when the heart rate reading falls outside of the heart rate threshold.

8. The method of claim 1, wherein the analyzing step further comprises audibly prompting the vehicle occupant through a human-machine interface (HMI) in response to receiving the diagnostic signal and gathering answers from the vehicle occupant to evaluate at least one of the nature or the severity of the potential medical condition.

9. The method of claim 1, wherein the analyzing step further comprises analyzing the diagnostic signal at an external object control module (EOCM) mounted within the vehicle, the external object control module (EOCM) and the vehicle system are in communication with one another via a communication bus.

10. The method of claim 1, further comprising the step: determining if the vehicle occupant to whom the occupant-coupled device is attached is a driver of the vehicle.

11. The method of claim 10, wherein the determining step further comprises receiving a sensor signal from at least one vehicle sensor selected from the group consisting of: an occupant detection sensor, an occupant recognition sensor, or a device detection sensor, and analyzing the sensor signal to determine if the vehicle occupant to whom the occupant-coupled device is attached is the driver of the vehicle.

12. The method of claim 11, wherein the vehicle sensor is an occupant detection sensor that indicates if an occupant is sitting in a particular seat in the vehicle, and the determining step further comprises analyzing the sensor signal from the occupant detection sensor to determine if the vehicle occupant to whom the occupant-coupled device is attached is the driver of the vehicle.

13. The method of claim 11, wherein the vehicle sensor is an occupant recognition sensor that indicates the identity of the occupant sitting in a particular seat in the vehicle, and the determining step further comprises analyzing the sensor signal from the occupant recognition sensor to determine if the vehicle occupant to whom the occupant-coupled device is attached is the driver of the vehicle.

14. The method of claim 11, wherein the vehicle sensor is a device detection sensor that indicates the presence or identity of an electronic device that is associated with a particular user, and the determining step further comprises analyzing the sensor signal from the device detection sensor to determine if the vehicle occupant to whom the occupant-coupled device is attached is the driver of the vehicle.

15. The method of claim 10, wherein the determining step further comprises audibly prompting the vehicle occupant through a human-machine interface (HMI) and gathering answers from the vehicle occupant to determine if the vehicle occupant is the driver of the vehicle.

16. The method of claim 10, wherein the determining step further comprises determining if the vehicle occupant is a driver of the vehicle at an external object control module (EOCM) mounted within the vehicle, the external object control module (EOCM), at least one vehicle sensor, and the vehicle system are in communication with one another via a communication bus.

17. A method of operating a vehicle when a vehicle occupant experiences a potential medical condition, comprising the steps of:
receiving a diagnostic signal from an occupant-coupled device, the diagnostic signal is a wireless signal that includes information regarding the potential medical condition of the vehicle occupant to whom the occupant-coupled device is attached;
analyzing the diagnostic signal to evaluate the potential medical condition of the vehicle occupant;
determining if the vehicle occupant to whom the occupant-coupled device is attached is a driver or a passenger of the vehicle; and
when the vehicle occupant is determined to be a passenger of the vehicle or when the vehicle occupant is determined to be the driver of the vehicle but the potential medical condition is deemed not significant then, in response to this determination, selecting a communication-based response and carrying out the communication-based response with a vehicle communications system to address the potential medical condition of the vehicle occupant.

18. The method of claim 17, wherein the carrying out step further comprises carrying out at least one communication-based response selected from the group consisting of:
contacting a pre-saved emergency contact, contacting an emergency medical facility, providing navigational directions to a medical facility, or providing medical instructions to the occupant of the vehicle for treating the potential medical condition.

19. The method of claim 10, when the vehicle occupant is determined to be the driver of the vehicle and the potential medical condition is deemed significant then, in response to this determination, the carrying out step further comprises selecting a driving-based response and carrying out the driving-based response with a vehicle driving system.

20. The method of claim 19, wherein the carrying out step further comprises carrying out at least one driving-based response selected from the group consisting of: autonomously or semi-autonomously controlling the steering of the vehicle, autonomously or semi-autonomously controlling the propulsion of the vehicle, or autonomously or semi-autonomously controlling the braking of the vehicle.

21. The method of claim 20, wherein the carrying out step further comprises carrying out at least one driving-based response by autonomously or semi-autonomously slowing the vehicle down and bringing it to a stop.

22. The method of claim 19, wherein the carrying out step further comprises carrying out the driving-based response with the vehicle driving system and carrying out a communication-based response with a vehicle communications system, the communication-based response includes one or more remedial action(s) that visually and/or audibly warn nearby people that the driver of the vehicle is experiencing a potential medical condition.

23. A system for operating a vehicle when a vehicle occupant experiences a potential medical condition, comprising:
an external object control module (EOCM) configured to receive a diagnostic signal from an occupant-coupled device, the diagnostic signal is a wireless signal that includes information regarding the potential medical condition of the vehicle occupant to whom the occupant-coupled device is attached;
a vehicle driving system coupled to the external object control module (EOCM) and configured to carry out a driving-based response that includes autonomous or semi-autonomous driving actions that control at least one of the steering, the propulsion, or the braking of the vehicle; and
a vehicle communication system coupled to the external object control module (EOCM) and configured to carry out a communication-based response that includes communicative actions that provide information regarding the potential medical condition;

wherein the system is configured to:
    evaluate the potential medical condition of the vehicle occupant by analyzing the diagnostic signal from the occupant-coupled device, analysis of the diagnostic signal includes obtaining a unique identifier for the occupant-coupled device, using the unique identifier to retrieve a saved medical profile or to identify the vehicle occupant to whom the occupant-coupled device is attached, and evaluating at least one of a nature or a severity of the potential medical condition according to criteria that are tailored to the saved medical profile or the identity of the vehicle occupant to whom the occupant-coupled device is attached, wherein the saved medical profile includes medical data or history pertaining to the vehicle occupant to whom the occupant-coupled device is attached, and
    carry out a response with at least one of the vehicle driving system or the vehicle communication system in response to the evaluation of the at least one of the nature or the severity of the potential medical condition.

* * * * *